United States Patent [19]

Reinstadler et al.

[11] 4,213,258
[45] Jul. 22, 1980

[54] STEAM IRON WATER GAUGE

[75] Inventors: Kenneth A. Reinstadler, Derby; William E. Davidson, Milford, both of Conn.

[73] Assignee: General Electric Company, New York, N.Y.

[21] Appl. No.: 955,105

[22] Filed: Oct. 23, 1978

[51] Int. Cl.² ............................................. D06F 75/06
[52] U.S. Cl. ..................................... 38/77.2; 73/306
[58] Field of Search .................... 38/77.2, 77.81, 77.83; 73/305, 306, 311, 322.5

[56] References Cited

U.S. PATENT DOCUMENTS

| | | | |
|---|---|---|---|
| 2,224,206 | 12/1946 | Wiggins | 73/306 |
| 2,510,663 | 6/1950 | Schuessler | 73/311 |
| 2,610,221 | 9/1952 | Keller | |
| 2,825,986 | 3/1958 | Pavlic | 38/77.2 |
| 3,156,054 | 11/1964 | Davidson | 38/77.81 |
| 3,193,954 | 7/1965 | Robison | 38/77.2 |
| 3,218,857 | 11/1965 | Van Woert | 73/306 |
| 3,298,119 | 1/1967 | Vieceli | 38/77.2 |
| 3,747,241 | 7/1973 | Davidson | 38/77.83 |
| 3,823,498 | 7/1974 | Davidson | 38/77.83 |
| 4,017,988 | 4/1977 | Coggiola | 38/77.83 |
| 4,021,943 | 5/1977 | McMullen | 38/77.2 |
| 4,031,638 | 6/1977 | Ryckman et al. | 38/77.2 |

Primary Examiner—Louis Rimrodt
Attorney, Agent, or Firm—John F. Cullen; George R. Powers; Leonard J. Platt

[57] ABSTRACT

In a steam iron having a connected handle with a steam control thereon, a fill opening to an interior water tank, a ported soleplate having a steam generating boiler with a coverplate thereover forming steam distribution passages and with a water sight gauge connected to the tank, an improvement is provided in the gauge of an opening in the top of the tank within the confines of the handle and disposed in the opening is a closed top vertically directed tube extending through the opening so that it extends both into the tank and into the handle and is sealed to the tank preventing leakage. An aperture is provided through the tube inside the tank in the upper portion thereof for venting the tube inside the tank and a window is provided in the handle and is sized to extend along part of the tube and including the top. Float structure is disposed in the tube with the float being covered by the window when the tank is empty. The float may include a sealed hollow cylinder slidable in the tube in one modification and a pair of spaced ball-like members connected by a wire strand with one ball floating on the water surface in another modification. Both floats preferably have a specific gravity of less than 1 for extreme buoyancy to give a fast response to water level when the iron is filled. The arrangement permits constant viewing of water level in the tank through the window when the iron is in horizontal or ironing position with the float disappearing when the tank is empty and also permitting the water to enter the tube so it is visible when the iron is being filled in the heel rest position.

6 Claims, 3 Drawing Figures

STEAM IRON WATER GAUGE

BACKGROUND OF THE INVENTION

1. Field of the Invention

The invention relates to steam irons and, more particularly, to an improved water gauge structure that is highly visible and gives a continuous indication of water level in the tank at all times.

2. Description of the Prior Art

It is well known to provide steam irons with some form of water level gauge for visual observance of the water level during ironing. Various types of gauges are used to monitor the water level, some indicating the level only when the iron is in a vertical or filling position and others indicating the level only when the iron is in a horizontal ironing position and some indicating water level in both positions. Such gauges have been somewhat complex structure using tubes or relatively large openings in the side walls or top walls of the iron and generally requiring numerous parts that must be accurately fitted during assembly. Similar water level gauges are common in other arts such as tanks, and all such gauges designed to indicate the water level of the container in which the gauge is disposed.

SUMMARY OF THE INVENTION

An object of the present invention is to provide, in a steam iron, an improved water gauge that is visible to indicate water level at all times when the iron is in an ironing position and it consists of few easily assembled parts.

Another object is to provide a water gauge construction that indicates water level in the flat ironing position or full and empty in the vertical position and uses few parts that are easily assembled into the iron.

A further object is to provide such an improved water gauge in a steam iron which has float structure with a specific gravity preferably less than 1 for greater buoyancy and fast response to water level change.

Briefly stated, a steam iron having a connected handle and steam control means is provided with a fill opening to an interior water tank, the iron having a ported soleplate with a steam generating boiler therein and a coverplate over the soleplate forming steam distribution passages and having a water sight gauge connected to the tank. To this known combination, an improvement is provided in the gauge structure comprising an opening in the top of the tank within the confines of the handle and through the opening a closed top tube means extends into the tank and into the handle portion above the tank with the tube being sealed to the tank opening. Aperture means for venting is provided through the tube entirely within the tank at the upper portion thereof and a window is disposed and aligned in the handle to extend along part of the tube including the top portion thereof. Float means, including different modifications is disposed in the tube and is preferably of a specific gravity less than 1 for fast response, when the tank is being filled. The window is sized to cover the float means in the tube below the window when the tank is empty. The float means may take the form of a closed slidable cylinder or a pair of spaced ball-like members connected by wire strand with one ball floating on the water surface. The arrangement is such that the water level is constantly visible in ironing position and the tank "full" condition may be read when the iron is on its heel rest position. Thus, the main object of the invention is to provide a steam iron with an improved water gauge of few parts that provides high, water level visibility promptly when the iron is either filled or the level changes during ironing.

DESCRIPTION OF THE PREFERRED EMBODIMENT

Figure 1:
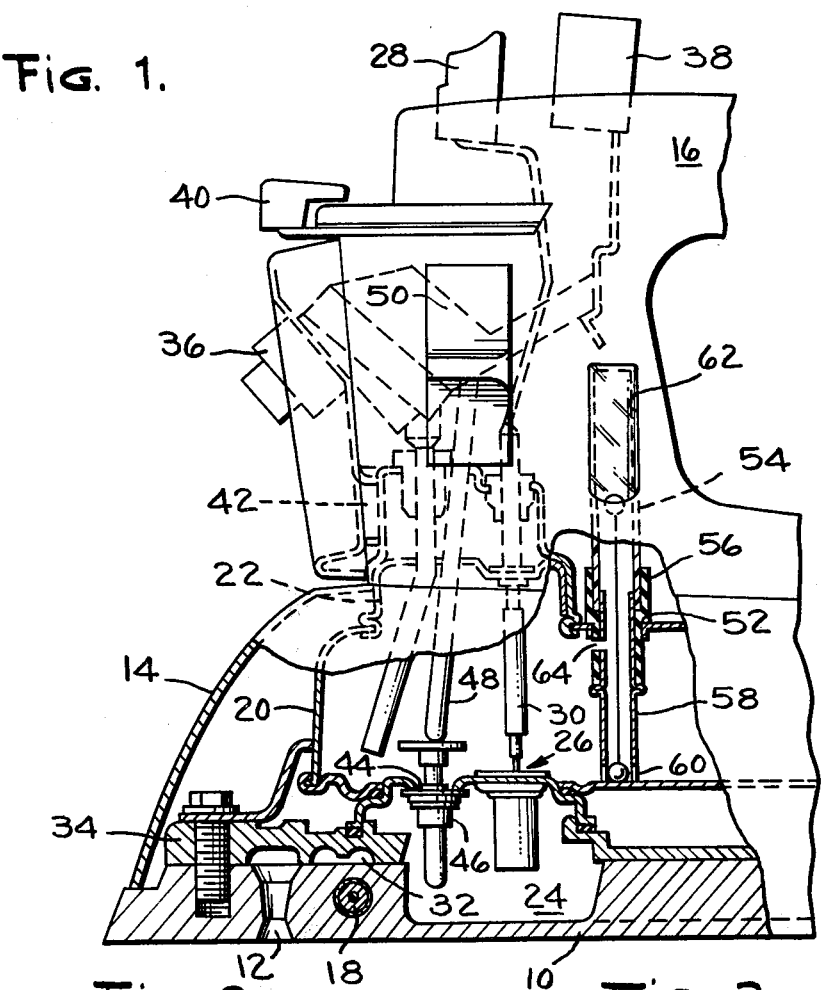
FIG. 1 is a view, partly in section, of a steam iron showing the location of the present invention.

The invention is described for convenience on a manual spray flash boiler steam iron although it is applicable to flooded boiler types shown in U.S. Pat. No. 3,156,054 of common assignment. It is also shown in connection with a self-cleaning iron where, on pushing a button, the water tank is suddenly emptied directly into the steam boiler and the suddenly generated steam forces substantially all loose mineral deposits from the iron. This is the concept of U.S. Pat. No. 3,747,241 as improved by U.S. Pat. No. 3,823,498 of common assignment. The suddenly generated steam forces the loose deposits out the soleplate ports as well known. The water gauge is applicable to any steam iron as will be apparent and is especially applicable to a self-clean iron as generally shown in FIG. 1. Referring to FIG. 1 there is shown a steam iron that includes soleplate 10 having plural steam ports 12 and outer shell 14 connected to handle 16 all in known fashion. Generally, in newer plastic irons both shell and handle 16 may be of a single molding as in a lightweight iron shown in U.S. Pat. No. 4,031,638 of common assignment. The soleplate may be wrought or cast aluminum with electrical heating element 18 cast in position. It is a sheathed type extending in a loop from the rear of the iron along one side to the forward end and then rearwardly along the other side in a conventional manner for uniform heat distribution to the soleplate.

The iron includes steam generating means by providing interior water tank 20 which may have a vertical outer suitably shaped riser tube means 22 in the forward portion for housing various operating mechanisms. For steam, soleplate 10 has a steam generating boiler 24 to receive metered water. The water is started and stopped for controlling steam generation by water valve structure generally indicated at 26 and activated by steam control means such as button 28 and connected spring-biased vertical stem 30. Water is metered through an orifice in conventional fashion from tank 20 into boiler 24, the resulting steam being distributed and directed through distribution passages 32 under coverplate 34 and out the ports 12 onto the fabric being ironed. If desired, a spray attachment 36 may be operated by control button 38 which also may, in lieu of the spray, be used to provide "surge" for an extra charge of steam in a well known manner. Temperature control 40 operates a thermostat to control the heat generated in the soleplate. In order to supply water to the tank 20 for steam, surge, and/or spray, fill opening 42 communicates directly with the water tank interior through the riser tube. When the iron has button 28 in the "up" position as shown in FIG. 1, water is metered to boiler 24 where flash steam is generated to find its way into distributing passages 32 and then out soleplate ports 12 in a known manner.

In the iron as shown, draining the water tank is no longer necessary because of a self-clean feature of means to conduct the entire tank contents directly into the boiler by providing the bottom of tank 20 with a substantially large opening 44 that may be spaced and separate from the usual metering orifice below stem 30. The opening 44 is controlled by dump valve 46 which may be spring-biased closed and actuated by a suitable steam and separate dump button 50 on the side of the handle. Depressing button 50 opens valve 46 dumping all the water from tank 20 directly into boiler 24. This sudden surge of water hitting the hot soleplate creates a large quantity of steam which is directly used to purge and self-clean the iron. This structure is conventional and now well-known and fully disclosed in U.S. Pat. No. 4,017,988 of common assignment.

Figure 2:
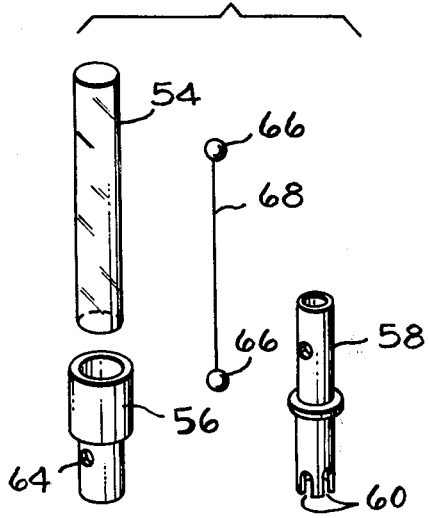
FIG. 2 is an exploded perspective view of one form of the water gauge.

In accordance with the invention, it is desired to have a visible indication of the water in tank 20 at all times during operation of the iron, to have it highly visible, rapidly responsive, and to know when the iron is full when on the vertical or heel rest position for filling. To this end, there is provided an opening 52 in the top and the forward portion of tank 20 and the opening is disposed directly below the vertical portion of the handle so that it is concealed within the handle portion as shown. Cooperating with the hole is a cylindrical closed top transparent tube means 54 that extends vertically both above and below the opening 52 as shown. The tube 54 is sealingly mounted to the top of the tank by an elastomer grommet 56 that is formed to depress and seal in opening 52 and also seal against the tube 54. The tube is extended down into the tank substantially to the bottom thereof in the FIG. 2 modification, by a suitable cylindrical member, such as eyelet 58, having bottom openings 60 to admit water to the tube from the bottom of the water tank. The tube 54 also extends substantially up into the handle above the tank and is visible from the outer part of the iron through a window 62 formed in the handle and extending and aligned along part of the tube that extends up into the handle. Since the tube is closed at the top, suitable vent or aperture means 64 extends through the tube and is disposed, to prevent any leakage, entirely within the tank 20 in the upper portion thereof as shown in FIG. 1. Additionally, aperture 64 and openings 60 permit air to be expelled from the tube, which is closed at its top, when the tube is horizontal when the iron is in filling position on its heel rest whereby the air can be expelled from the tube. Thus, the tube with no additional structure, performs a dual function acting as a fill limiting means when filling the iron on its heel rest position since the tube fills only as the tank is full. For visibility of the water level within the tank, colored floats, such as a pair of spaced ball members 66, may be made from foamed silicon rubber and are separately spaced by a fine strand of stainless wire 68 for a fast reaction and immediate visibility of the water level. The floats have a specific gravity of at or less than 1 so that they are very buoyant for a popping response. The result is that the rubber float assembly is subject to buoyant forces to indicate fullness of the tank. The upper float 66 bobs like a cork and indicates until completely empty. In other words, the float disappears when the tank is empty to indicate refilling is necessary.

As described, when the iron is in the vertical filling or heel rest position as it is being filled with water through opening 42, the water level spills into the tube through openings 60 in eyelet 58 and the air escapes through aperture 64 which permits the water to enter the tube, where it then becomes a visual signal that the iron is full since the aperture 64 is generally above the water level when in the ironing position as seen in FIG. 1. Ball float 66 rises and falls with the level of the water in the tank when the iron is horizontal, disappearing behind the lower portion of window 62 when the tank is empty while the lower float is always submerged in the tank.

Figure 3:
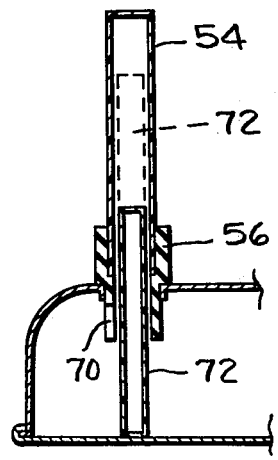
FIG. 3 is a partial cross-section of another modification of gauge.

A modification that is similar but uses fewer parts is shown in FIG. 3 where tube 54 and grommet 56 are identical but no eyelet 58 is required. The air escapes through a larger comparable aperture 70. In this case the indicator is a sealed hollow cylinder 72 which may be a bright metal tube with either a vacuum inside or a hydrogen gas filled space and again preferably of a specific gravity less than 1 in order to be extremely buoyant and fast acting. The cylinder 72 is slidable in the tube and is of a length sufficient to include a portion in the tube at all times when the tank is empty and the cylinder abuts the tank bottom as shown in FIG. 3. Again the window 62 and float cylinder 72 are sized that the cylinder disappears behind the lower portion of the window when the tank is empty and the iron is horizontal. The tube again, without additional structure, performs a dual function of indicating water level when the iron is horizontal and also acts as a fill limiting means when filling the iron on its heel since the tube will fill only as the tank fills.

The assembly is simple and straightforward, being vented within the tank 20 to which the gauge is sealed by the grommet 56 structure, so there is no possibility of leaking when the iron is in upright heel rest position which can happen if the tube 54 were vented at its top as in many water level gauge applications. The system indicates a constant and rapid high visibility water level at all times and is neatly nested in the front portion of the handle requiring little space and using few parts. The gauge thus indicates full in both the horizontal and vertical positions of the iron and provides a continuous water level indication in the ironing position while also reading empty in both positions of the iron.

While we have hereinbefore shown preferred forms of the invention, obvious equivalent variations are possible in light of the above teachings. It is therefore to be understood that, within the scope of the appended claims, the invention may be practiced otherwise than as specifically described, and the claims are intended to cover such equivalent variations.

We claim:

1. In a steam iron with a connected handle and having steam control means, a fill opening to an interior water tank, a ported soleplate, a steam generating boiler with coverplate forming steam distribution passages and a water sight gauge connected to said tank, an improvement in said gauge comprising, an opening forward in the top of said tank, closed top tube means sealed in and extending through said opening into said tank, aperture means through said tube within the tank upper portion, a window extending and aligned along part of said tube and including the top thereof, and float means in said tube to indicate water level in said tank through said window, whereby said gauge indicates water level and empty horizontally and indicates full water level in heel rest position to limit overfilling.

2. Apparatus as described in claim 1 wherein said opening is within said handle so said tube extends into said handle above the tank and said window is disposed in the handle.

3. Apparatus as described in claim 2 wherein said tube is vertically disposed in the iron and said handle window is sized to cover said float means in the tube below the window when the tank is empty, said opening through said tube into said tank causing said tube to have a dual function including a fill limiting means when filling said iron on its heel.

4. Apparatus as described in claim 3 wherein said float has a specific gravity less than 1 for fast popping response.

5. Apparatus as described in claim 4 wherein said float means includes a pair of spaced ball-like members connected by a wire strand, one ball floating on the water surface and the other submerged in said tank.

6. Apparatus as described in claim 4 wherein said float means includes a sealed hollow cylinder slidable in said tube and sized to include a portion in the tube at all times when in tank empty indication with the cylinder abutting the tank bottom.

* * * * *